UNITED STATES PATENT OFFICE.

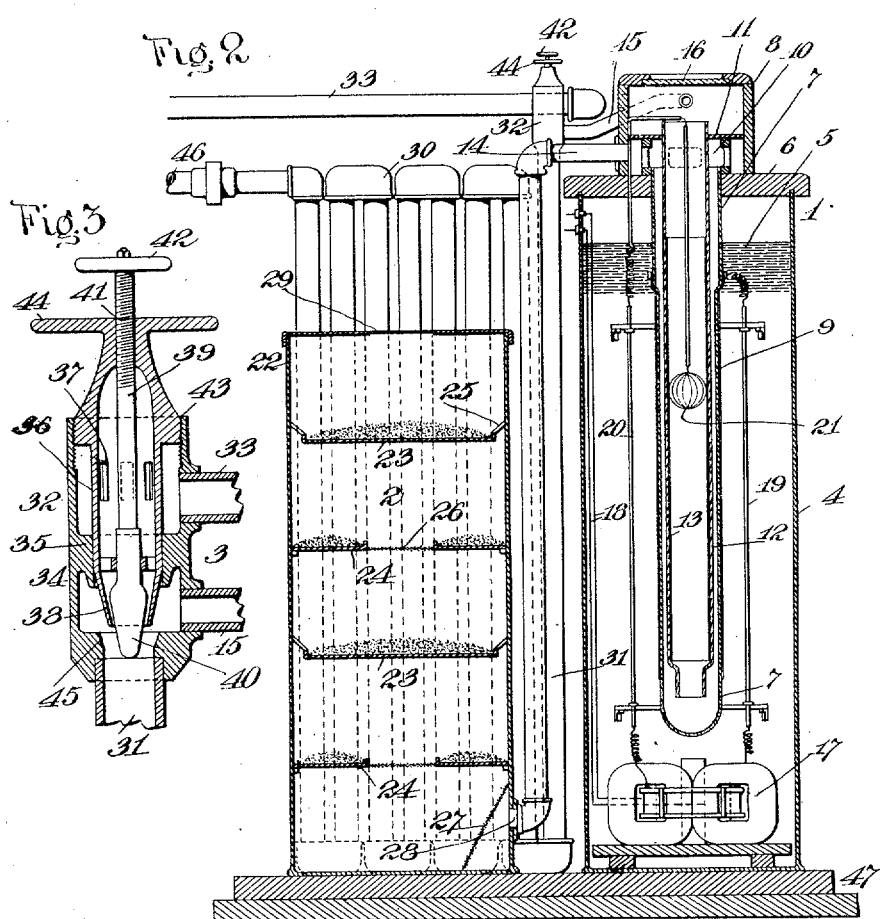

CLIFFORD D. MEEKER, OF EAST ORANGE, NEW JERSEY, AND CHARLES FRED WALLACE, OF NEW YORK, N. Y., ASSIGNORS TO GERARD OZONE PROCESS COMPANY, OF NEW YORK, N. Y., A CORPORATION OF NEW JERSEY.

WATER-STERILIZING APPARATUS.

986,194.      Specification of Letters Patent.      Patented Mar. 7, 1911.

Application filed August 4, 1910. Serial No. 575,492.

*To all whom it may concern:*

Be it known that we, CLIFFORD D. MEEKER, a citizen of the United States of America, residing in East Orange, Essex county, State of New Jersey, and CHARLES FRED WALLACE, a citizen of the United States, residing in Staten Island, Richmond county, city and State of New York, have invented a certain new and useful Water-Sterilizing Apparatus, of which the following is a specification.

This invention relates to improvements in devices for sterilizing water by means of ozone, and has for its object to produce a simple, cheap and effective device for ozonizing water, the device being self-contained and occupying a minimum amount of space. These and further objects will more fully appear from consideration of the embodiment of our invention set forth in the following specification and accompanying drawings, considered together or separately.

In the drawings Figure 1 is a plan view of a device embodying our invention. Fig. 2 is a section on the line 2—2 of Fig. 1, looking upward on the page; and Fig. 3 is a section on an enlarged scale, of the injector for mixing the water and ozone.

In all of the views, like parts are designated by the same reference characters.

The embodiment of our invention chosen for illustration comprises an ozonizer 1, an air drier 2, and a mixer 3. The ozonizer in the embodiment chosen for illustration comprises a single element although of course a plurality might be used. This element, as shown, embodies the principles of the ozonizer invented by Leon Gerard and disclosed in application Serial No. 386,659, filed August 1st, 1907, and also illustrated in the copending application for patent of Clifford D. Meeker, Serial No. 575,393, filed August 4, 1910, assigned to the same assignee as the present application. Generally speaking, this ozonizer comprises inner and outer glass tubes, with tin foil on the outside of the outer tube and on the inside of the inner tube, said tubes being immersed in oil or other liquid insulating and cooling medium contained in a suitable chamber. The high tension electric discharge takes place between the coatings of tin foil, and the air to be ozonized is passed through the annular space between the tubes. Specifically considered, the ozonizer herein shown comprises a chamber 4 containing a body of oil 5. This chamber is closed at the top by a cover 6 of slate, stone, or other insulating material, said cover supporting the outer tube 7, of glass or other suitable dielectric. This cover also supports a box 8, formed of porcelain or other suitable insulating material. The outer tube 7 is closed at its lower end and is surrounded for a suitable portion of its length with a layer of tinfoil 9, or other suitable conducting material. This outer tube 7 communicates at its upper end with a small box 10, which rests upon the upper surface of the cover 6. This box is provided with openings in the side walls, as shown. Over this box is supported a diaphragm 11, which divides the box 8 into two portions. This diaphragm has a central opening, within which is supported the inner tube 12, also of glass or other suitable dielectric. A portion of the length of this inner tube is lined with tinfoil 13, or other suitable conducting material. The air inlet 14 communicates with the box 8 below the diaphragm 11, and the ozone outlet 15 communicates with the box above the diaphragm. The cover of the box contains a glass window 16, permitting observation of the working of the apparatus. The tinfoils on the outer and inner tubes are connected to suitable high tension circuits, so as to produce the silent discharge as disclosed in the afore-specified applications of Leon Gerard and Clifford D. Meeker. This high tension current is produced by a transformer 17, which lies within the chamber 4 and is entirely surrounded by the bath of oil 5. The low tension leads 18 enter the chamber above the oil bath and pass down to the transformer. The high tension leads pass up through the oil, one lead 19 connecting with the tinfoil on the outer tube, preferably near the top so as to be accessible. The second high tension lead 20 passes through the cover 6, into the box 8, and through the diaphragm 11, and then passes down through the center of the inner tube to a basket connector 21, which frictionally engages with the tinfoil on the inner tube and makes electrical connection therewith. That portion of the high tension lead 20 which passes through the cover is preferably a rod and extends below the surface of the oil so as to prevent points and consequent leakage at that place. It is connected below the oil with the other portion of the high tension lead by a flexible wire, as shown. This wire is coiled so as to permit the removal of the cover a sufficient degree for a person to reach in and disconnect the wire. The upper portion of the outer tube is increased in diameter, as shown, and the lower portion of the inner tube is decreased in order to separate the foils at the extremities and prevent concentration of discharge at these points, as is disclosed in the co-pending application of Leon Gerard before identified.

The air drier 2 comprises a casing 22, preferably rectangular, as shown, and provided with a series of trays 23 and 24. The trays 23 are solid and slightly smaller than the internal diameter of the casing, and are secured thereto by angles or supports 25, so as to produce an opening between the outer edge of the tray and the inner wall of the casing. The trays 24 are substantially the same size as the internal diameter of the casing, and are provided with central openings 26, covered by netting or screen. These trays are arranged in alternation, and are covered with unslaked lime or other suitable hygroscopic material. The edges of the trays and the edges of the center openings are flanged up, as shown, to prevent this material from being lost over the edges. At the bottom of the chamber is an inclined screen 27, and back of this screen is the air outlet 28, which communicates with the air inlet 14 of the ozonizer. At the top of the casing is an opening 29, which is provided with a screen to prevent the entrance of foreign matter and permit the free entrance of air.

The mixer 3 has a coil 30, of pipe as a basis. Connected with this coil is a vertical pipe 31. At the top of this pipe 31 is the injector or mixing valve 32. Water enters the mixing valve through a pipe 33, and the ozone enters it through the pipe 15. The injector or mixing valve comprises a casing 34, to which are attached the pipes 33, 15 and 31. The diaphragm 35 divides the casing into two chambers, the upper chamber being connected with the water pipe 33 and the lower chamber being connected with the ozone pipe 15. A central opening is arranged in this diaphragm, within which lies a barrel 36. This barrel is hollow and provided with entrance openings 37, for the water, and a nozzle 38. It also has a bearing for the spindle 39, which carries the needle valve 40, such needle valve lying within the nozzle 38. This spindle is screw-threaded at its upper end at 41, and is provided with an operating handle 42. The barrel is also screw-threaded at 43 in the casing 34, and is provided with an adjusting handle 44. The outer end of the vertical pipe 31 communicates with a seat 45, within which the nozzle 38 may seat. The operation of this injector is as follows.

The water under sufficient pressure to secure the necessary velocity, enters the casing 34 through pipe 33, and passes through the openings 37 into the barrel 36, and then passes around the needle valve 40 through the nozzle 38 in the form of an annular jet the thickness of which can be regulated by the needle valve. This annular jet of water will, by its velocity, produce a sufficient suction to draw in ozone through the pipe 15 and carry it onward with the water through the space between the needle valve and the seat 45 and into the pipe 31. The jet of water will be thoroughly broken up and the ozone will be mixed with it. A further mixture will occur in the vertical pipe 31 and in the coil 30, before the mixture of water and ozone passes out at the outlet 46.

The entire apparatus, comprising the ozonizer, air drier, and mixer, is supported upon a base 47.

In accordance with the provisions of the patent statutes, we have described the principle of our invention, together with the apparatus which we now consider to represent the best embodiment thereof; but we desire to have it understood that the apparatus shown is merely illustrative and that the invention can be carried out in other ways.

Having now described our invention, what we claim as new and desire to secure by Letters Patent, is—

1. A water sterilizer having a tank containing oil, an ozonizer element submerged in said oil, a transformer also submerged in said oil, and electrical connections from said transformer to the ozonizer element having joints therein located within the body of oil.

2. An ozonizer which comprises an inclosed tank a cover for the tank, said cover having an opening, an outer tube mounted within the opening, a box on the cover, said box having a diaphragm, an opening within the diaphragm and an inner tube mounted in the opening, said inner tube lying within the outer tube.

This specification signed and witnessed this 21st day of July 1910.

CLIFFORD D. MEEKER.
CHARLES FRED WALLACE.

Witnesses:
A. E. WARD,
WM. H. CAPEL.